FIG. 1

INVENTOR.
ZOLTAN KOVATS
DAVID J. GESTLER
HARRY W. FISHER

*Strauch, Nolan, Neale,
Nies & Bronaugh*

ATTORNEYS

Aug. 27, 1968     Z. KOVATS ET AL     3,398,577
MAGNETIC COUPLING DRIVE ASSEMBLY FOR FLUID FLOW METERS
Filed Jan. 20, 1966                    5 Sheets-Sheet 4

INVENTOR
ZOLTAN KOVATS
DAVID J. GESTLER
HARRY W. FISHER
BY
ATTORNEYS

United States Patent Office 3,398,577
Patented Aug. 27, 1968

3,398,577
MAGNETIC COUPLING DRIVE ASSEMBLY FOR FLUID FLOW METERS
Zoltan Kovats, Pittsburgh, David J. Gestler, Trafford, and Harry W. Fisher, Pittsburgh, Pa., assignors to Rockwell Manufacturing Company, Pittsburgh, Pa., a corporation of Pennsylvania
Filed Jan. 20, 1966, Ser. No. 521,775
31 Claims. (Cl. 73—231)

ABSTRACT OF THE DISCLOSURE

A magnetic coupling drive assembly for a fluid flow meter wherein a permanent drive magnet, which is mounted for rotation with the metering rotor, is magnetically coupled by a non-permanently magnetizable core structure to a permanent driven magnet which is fixed on a register drive shaft extending transversely of the rotor rotational axis. The non-permanently magnetizable core structure is fixed against displacement in the meter housing and comprises at least one core piece extending between the drive and driven magnets and having pole faces spaced from and magnetically coupled to the drive and driven magnets, whereby the register drive shaft is rotated in response to rotation of the metering rotor.

---

This invention relates to magnetic coupling assemblies for fluid meter register drives and the like.

Prior to this invention, it has been the practice to employ magnetic coupling assemblies for drive connecting a fluid driven metering rotor to a register or the like as described in United States Letters Patent No. 3,163,041. Such magnetic coupling assemblies as described in this patent require that the rotational axes of the drive and follower magnets axially align with each other.

Since the register input shaft in axial flow meters and the like extend at an angle of about 90° with respect to the rotational axis of the metering rotor, it is necessary when employing a magnet coupling of the type described above to provide an additional connection, such as a gear train, to connect angularly related shafts in the register drive train. The added gear train connection is objectionable since it increases the mechanical friction resisting rotation of the fluid impelled, metering rotor to thereby impair the accuracy of the meter.

A major object of this invention is to provide a novel magnetic coupling register drive assembly wherein the angle between the rotational axes of the drive and follower magnets may be of any selected value, thereby eliminating the need for a gear train connection or the like for connecting angularly related shafts as required in prior meter register drives.

A more specific object of this invention is to provide a novel magnetic coupling assembly having permanent drive and driven magnets magnetically coupled to each other by a non-permanently magnetizable flux keeper assembly which defines a magnet flux path between the drive and driven magnets.

According to this invention, therefore, the driven magnet may be mounted for rotation about an axis extending transversely of the rotational axis of the drive. In addition, the driven magnet does not have to be located adjacent to or coextensive with the drive magnet. As a result, the parts in the meter register drive train of this invention may be arranged to provide for a more compact, efficiently organized structure.

Another object of this invention is to provide for a novel magnetic coupling assembly wherein the drive and driven magnets and a flux keeper assembly magnetically coupling the magnets to each other are accurately oriented relative to each other in a drive train for a meter register or the like.

Still another object of this invention is to provide a novel metering rotor and register drive train insert assembly containing the magnetic coupling described in the previous objects.

Further objects of this invention will appear as the description proceeds in connection with the appended claims and the annexed drawings wherein:

Figure 1:
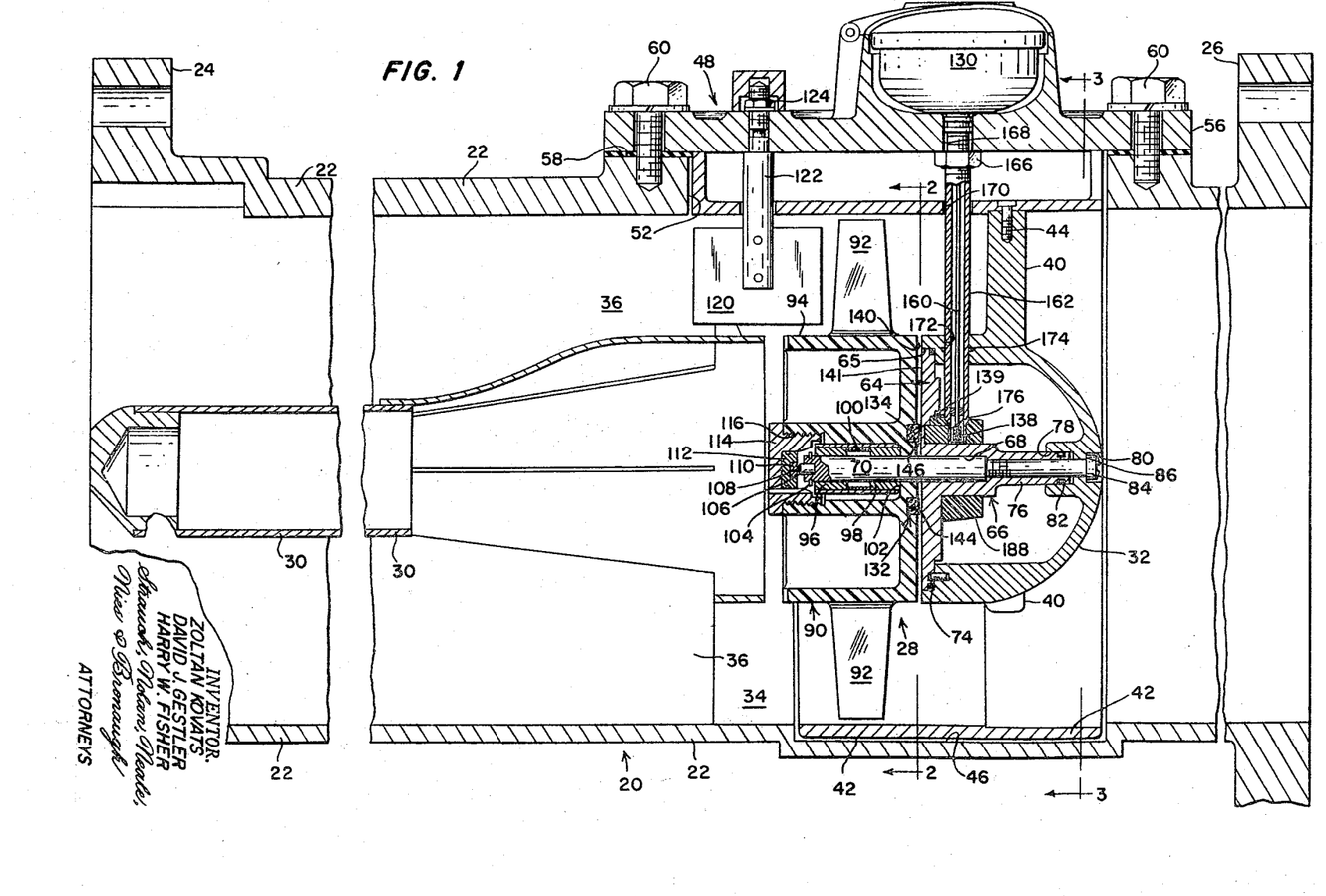
FIGURE 1 is a longitudinal section of an axial flow turbine meter incorporating the principles of this invention.

Referring now to the drawings and more particularly to FIGURE 1, the reference numeral 20 generally designates an axial flow turbine meter particularly adapted for use in metering liquids such as water and comprising a one-piece housing 22 having an essentially tubular configuration and terminating at opposite ends in radially extending pipe attachment flanges 24 and 26. The internal diameter of housing 22 preferably is substantially equal to that of the conduit in which meter 20 is disposed for fluid flow measuring purposes.

With continuing reference to FIGURE 1, a measuring rotor assembly 28 is coaxially mounted within housing 22 axially between an upstream core 30 and a downstream core 32. Cores 30 and 32 are mutually aligned coaxially in housing 22 and cooperate with rotor assembly 28 to form an annular channel 34 between the inlet end of the meter at flange 24 and the outlet end of the meter at flange 26.

As shown, core 30 is provided with a bullet-shaped nose to provide for a smooth divergence of fluid flowing into channel 34. A plurality of radial straightening vanes 36 are fixed to core 30 and extend from a region just upstream from rotor assembly 28 to the inlet end of meter 20 at flange 24. Vanes 36 support core 30 in housing 22.

Figure 3:
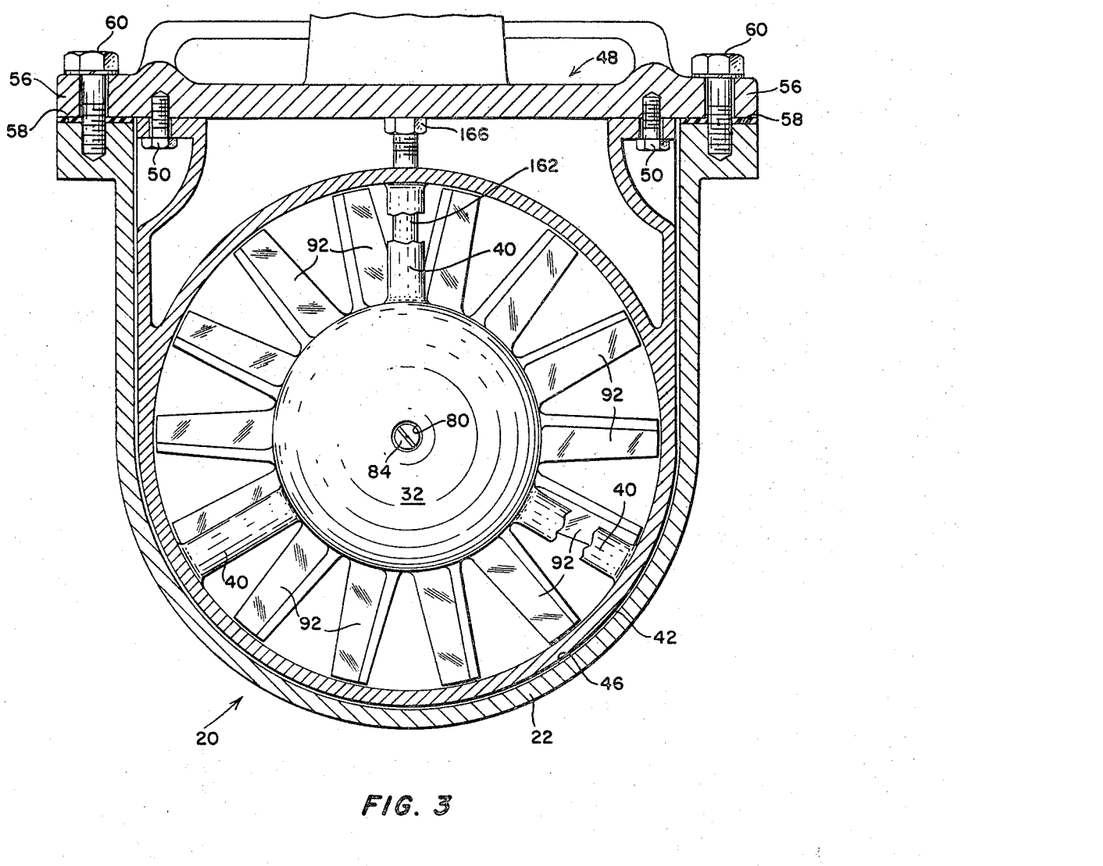
FIGURE 3 is a section taken substantially along lines 3—3 of FIGURE 1.

Core 32 is of hollow, generally cylindrical configuration having a closed faired end to provide for a smooth convergence of fluid flowing out of channel 34 at flange 26. Core 32, as shown in FIGURES 1 and 3, cantilever mounts rotor assembly 28 and is formed with radially extending ribs 40 which are fixed at their outer ends to a rotor shroud 42 by machine screw 44 (one shown in FIGURE 1). Shroud 42 is formed with a uniformly diametered, smooth, inner, cylindrical, peripheral surface which circumferentially surrounds rotor assembly 28 and which is coaxial with the longitudinal axis of housing 22.

Figure 2:
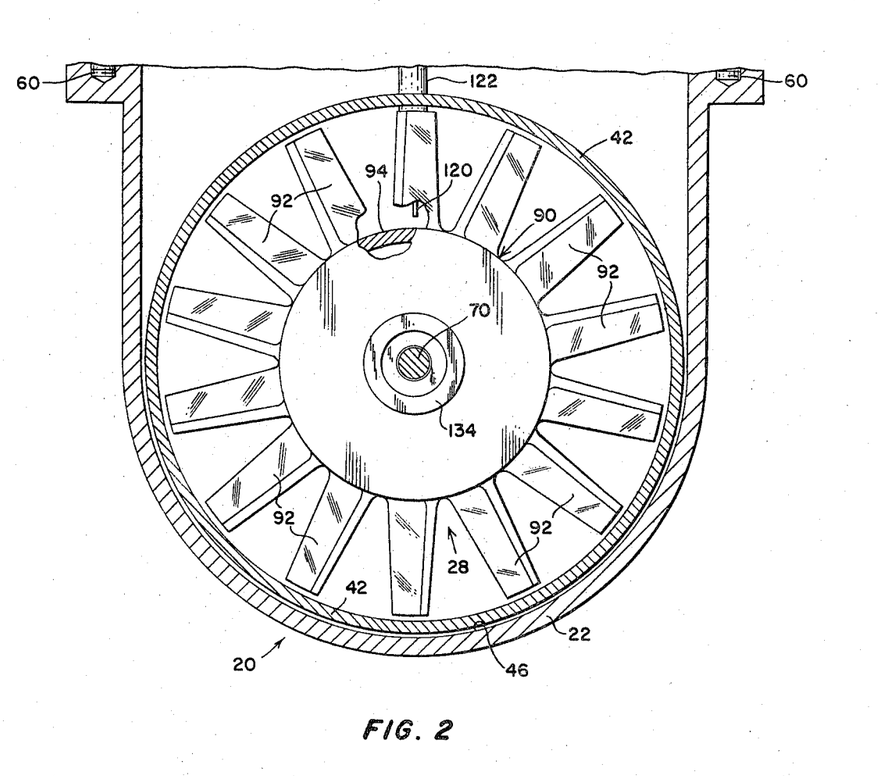
FIGURE 2 is a section taken substantially along lines 2—2 of FIGURE 1.

As shown in FIGURE 2, housing 22 is formed with a circumferential, inwardly opening recess 46 which receives shroud 42. The internal diameter of shroud 42 preferably is equal to the internal diameter of housing 22 on opposite sides of recess 46 and forms a continuation of the internal periphery of housing 22 on opposite sides of recess 46 to provide for a smooth fluid guide surface delimiting the outer boundary of channel 34 between the inlet and outlet ends of the meter.

As shown in FIGURE 3, shroud 42 is fixed to a cover plate 48 by cap screws 50. Cover plate 48 extends over a side opening 52 formed in housing 22 between flanges 24 and 26. As shown, cover plate 48 is rimmed with a flange 56 which is seated on a flat, annular, machined, flange surface 58 machined on housing 22 surrounding opening 52. Cap screws 60 extending through flange 56 detachably secure cover plate 48 to housing 22.

From the meter construction thus far described, it is apparent that the assembly of shroud 42, core 32, and rotor assembly 28 are all supported from cover plate 48 and are removable as a unit along with cover plate 48 by removing screws 60. Thus the suspended assembly of shroud 42, core 32, and rotor assembly 28 is insertable and removable as a unit through side opening 52 without requiring the pipeline connections at flanges 24 and 26 to be broken. Replacement of this unitary assembly is thus easily and conveniently facilitated in the field.

Figure 4:
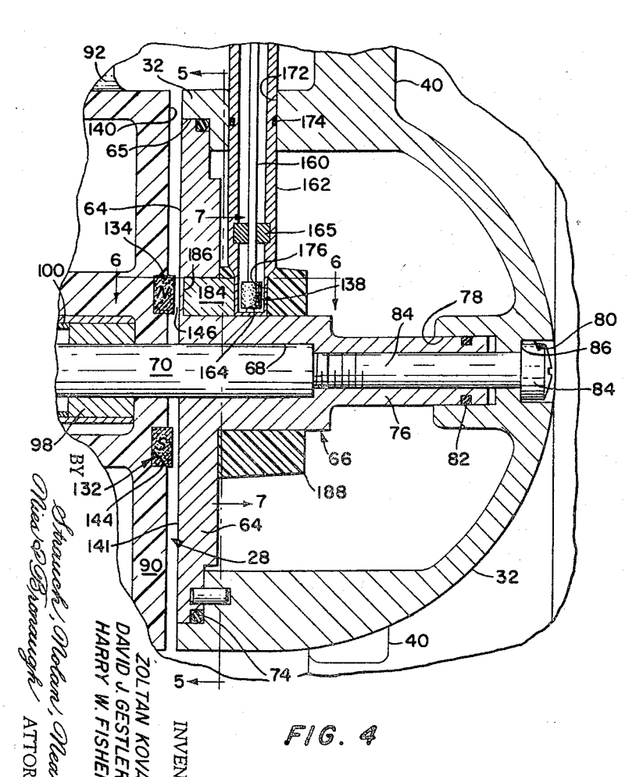
FIGURE 4 is an enlarged view of the rotor and magnetic drive assembly illustrated in FIGURE 1.

As shown in FIGURES 1 and 4, core 32 is formed with an open end facing rotor assembly 28 and closed by a rotor support plate 64. Plate 64, which is non-ferromagnetic, is interfittingly seated in a bored recess 65 formed coaxially in core 32 and has an integral elongated hub 66. Hub 66 is formed with a stepped bore 68 which is coaxial with the longitudinal axis of the meter and which coaxially receives rotor support shaft 70 forming a part of assembly 28. Support plate 64 is suitably fixed to core 32 and carries a resilient O-ring 74 which is compressed against the internal periphery of recess 65 to provide a fluid-tight seal between cover plate 64 and core 32.

Hub 66, as best shown in FIGURE 4, extends coaxially into the interior of core 32 and terminates in a reduced diametered end section 76. End section 76 is snugly, coaxially received in an enlarged section 78 of a stepped bore 80 which is coaxially formed through the faired end of core 32. A groove-seated O-ring 82 carried by hub section 76 is compressed against the smooth cylindrical periphery of bore section 78 to establish a fluid-tight seal between hub section 76 and core 32, O-rings 74 and 82 cooperate with support plate 64 to seal off the interior of core 32 from fluid flowing through the meter.

With continuing reference to FIGURE 4, a head screw 84 extends coaxially through stepped bore 78 and hub section 76 and is threaded into the downstream end of shaft 70 received in bore 68. The head of screw 84 is seated against an annular axially outwardly opening shoulder 86 to axially retain shaft 70 in place. Shaft 70 bottoms on an annular shoulder formed between stepped sections in bore 68, while the end of section 76 is held in axially spaced relation to the step in stepped bore 80 by the abutment of plate 64 with bored recess 65. Threading of screw 84 into shaft 70 thus draws shaft 70 into engagement with the step in stepped bore 68 and holds plate 64 in position in recess 65.

A peripherally bladed, turbine metering rotor 90 forming a part of assembly 28 is mounted on the upstream end of shaft 70 which extends between cores 30 and 32. Rotor 90 preferably is made of suitable plastic such as polypropylene and comprises a series of straight blades 92. Blades 92 extend radially across channel 34 and are formed rigid at their inner ends with a cylindrical rotor hub 94. Hub 94 is coaxially journalled on shaft 70 by axially spaced apart bearings 96 and 98 each comprising a bushing that is preferably made of graphite. A spacer 100 circumferentially surrounding shaft 70 retains bearings 96 and 98 in axially spaced apart relation. The assembly of bearings 96 and 98 and spacer 100 are axially retained in place between an annular shoulder 102 and a groove-seated snap ring 104 which is carried by the upstream end of shaft 70.

An axially forwardly opening socket 106 formed in the upstream end of shaft 70 receives a thrust bearing 108. Bearing 108 is formed with a segmental spherical surface which axially bears against a suitable thrust plate 110. Thrust plate 110 is snugly seated in an interfitting groove which is formed in a mounting plate 112. Plate 112 is fixed in a removable plug 114 which is threadedly secured in a tapped bore section 116 coaxially formed in the upstream side of hub 94.

As shown in FIGURE 1, hub 94 is located at opposite ends closely adjacent to cores 30 and 32 and is formed with a diameter that is equal to the diameters of the cylindrical portions of cores 30 and 32 to provide for a smooth, uniformly diametered, substantially uninterrupted, inner boundary delimiting channel 34. Each of the blades 92 of rotor 90 is provided with a uniform, radially outwardly extending taper with the result that the root of each blade immediately adjacent to hub 94 is larger than the tip of the blade adjacent to the inner periphery of shroud 42. Blades 92 preferably are turned such that they make an acute angle of attack with the longitudinal axis of channel 34. This blade construction has been found to provide for improved metering accuracy. All of the fluid flowing through the meter passes through channel 34 to impart rotation to rotor 90 in the usual manner.

A calibrating vane 120 is shown in FIGURE 1 to be fixed on a shaft 122 upstream from an adjacent the tips of blades 92. Shaft 122 is rotatably mounted on cover plate 48 and is releasably secured in place by a nut 124. The axis of shaft 122 normally intersects the rotational axis of rotor 90. Vane 120 is factory adjusted and is fixed in its adjusted position by tightening nut 124.

In accordance with this invention, the rotation of rotor 90 is transmitted to drive a regiser 130 by a novel magnetic coupling assembly 132. Assembly 132 is shown in FIGURES 1 and 4 to consist of an annular, permanent, ceramic driving magnet 134, an annular, permanent, ceramic follower magnet 138, and a flux keeper unit 139. Flux keeper unit 139, as will be described in greater detail later on, is of such construction as to enable magnets 134 and 138 to be mounted for rotation about axes which intersect with each other at right angles.

With continuing reference to FIGURES 1 and 4, the axially opposed end faces of hub 94 and support plate 64 are respectively indicated at 140 and 141 and are contained in closely adjacent, parallel, spaced apart planes extending at right angles to the rotational axis of rotor 90. Magnet 134 is snugly and interfittingly seated in an annular recess 144 concentrically formed in hub 94 and opening axially towards end face 141 of plate 64. As shown, magnet 134 protrudes axially beyond recess 144 by a short distance and is axially spaced forwardly from end face 141 to provide for a small, axially extending air gap 146.

Magnet 138 is fixed on the lower end of a register drive shaft 160 which extends coaxially upwardly through a well 162 made of suitable non-magnetic material such as stainless steel. Well 162 is open at its upper end and closed at its lower end by an end wall 164. Shaft 160 is journalled by bearings 165 (one shown) in well 162 for rotation about an axis normally intersecting the rotational axis of rotor 90.

The upper end of well 162 is threaded into a nut 166 (see FIGURE 1) which is fixed to the underside of cover plate 48. Shaft 160 extends beyond the upper end of well 162 and through a bore 168 in cover plate 48 for connection to the drive train (not shown) of register 130.

Well 162 extends downwardly from the underside of cover plate 48 through axially aligning bores 170 and 172 which are respectively formed in shroud 42 and core 32. A groove-seated O-ring 174 carried by the section of well 162 received in bore 172 is compressed against the internal periphery of bore 172 to establish a fluid-tight seal between well 162 and core 32. Register 130 is preferably a sealed unit of the type shown in United States Letters Patent No. 2,858,461 issued on October 28, 1958 to which reference is made for further detail.

The lower end of well 160 is coaxially, snugly received in a blind bore 176 in a manner to be described in greater detail later on.

Figures 6, 7, 8:
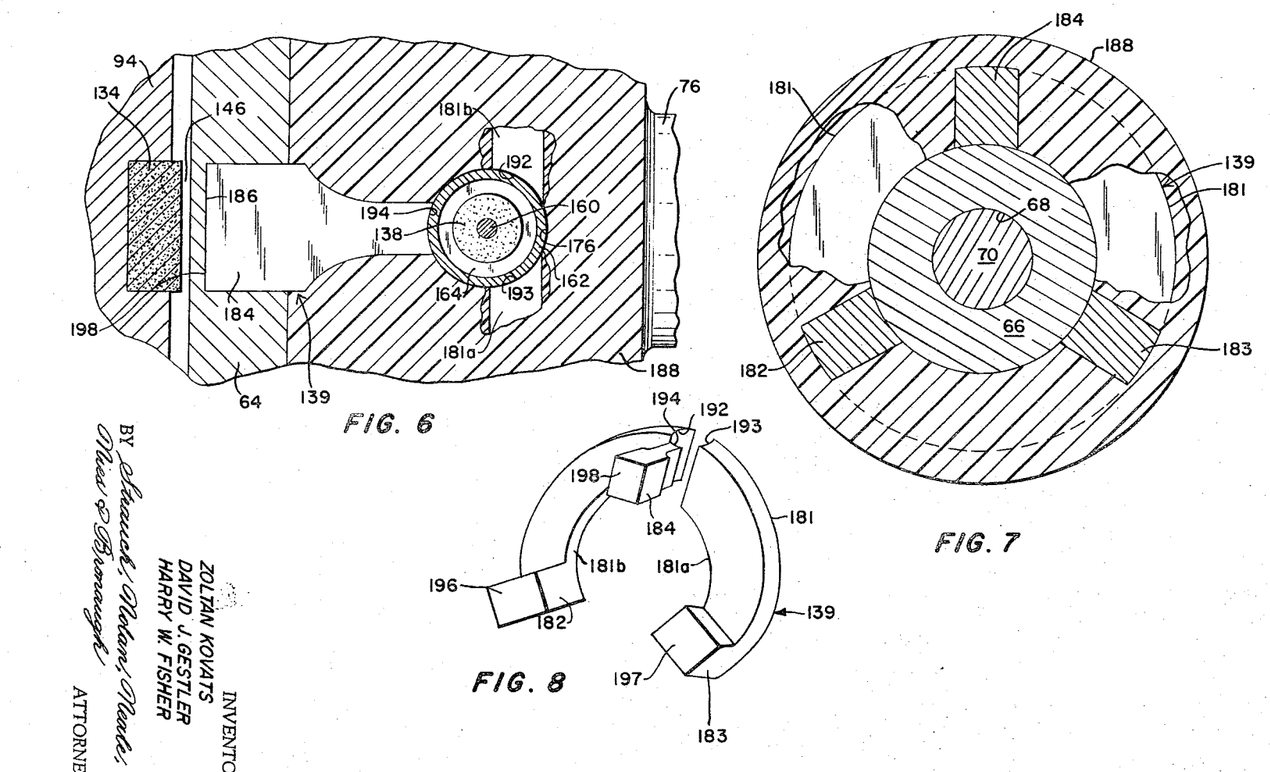
FIGURE 6 is a section taken substantially along lines 6—6 of FIGURE 4.
FIGURE 7 is a section taken substantially along lines 7—7 of FIGURE 4.
FIGURE 8 is a perspective view of the flux keeper assembly for the magnetic driven shown in FIGURES 1 and 4–7.

As best shown in FIGURE 8, the flux keeper unit 139 comprises a generally horseshoe-shaped, flat-sided plate section 181 and three axially extending, substantially parallel flux keeper sections 182, 183, and 184. Keeper sections 182–184 and plate section 181 are initially machined or otherwise formed as an integral piece made of non-permanently magnetizable, soft iron. Keeper sections 182 and 183 project forwardly from the lower ends of plate section 181 in parallel relation with the longitudinal axis of plate section 181. Keeper section 184 extends forwardly from a region of plate section 181 that is medially between the ends joined to sections 182 and 183. Plate section 181 is formed with an internal uniform radius of curvature. Keeper sections 182–184 are spaced at equal radii equiangularly around the mean radius of plate section 181. The angular spacing between sections 182–184 is thus 120°.

Prior to separation into the three parts shown in FIGURE 8, the integral piece consisting of sections 181–184 is assembled by seating plate section 181 on the smooth, cylindrical periphery of hub 66 and by inserting the forward ends of keeper sections 182–184 into respective, interfitting recesses 186 which are formed in support plate 64. The internal radius of curvature of plate section 181 is essentially the same as the outside hub radius so that plate section 181 seatingly interfits with and partially circumferentially surrounds hub 66. The integral piece consisting of sections 181–184 is positioned by recesses 186 such that keeper section 184 is on top of hub 66 and keeper sections 182 and 183 are on opposite sides of the hub 120 degrees apart as shown in FIGURES 5 and 7.

Figure 5:
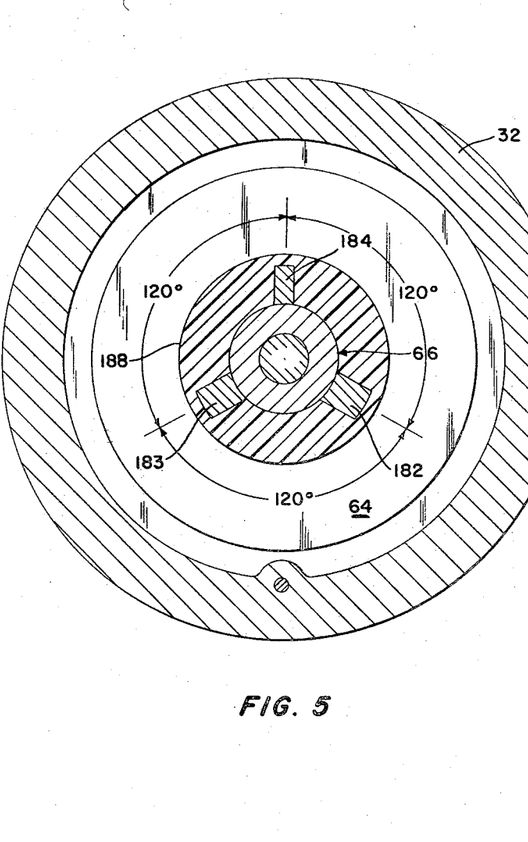
FIGURE 5 is a section taken subsctantially along lines 5—5 of FIGURE 4.

After the integral flux keeper piece consisting of sections 181–184 is mounted in place, an annular mass 188 of suitable non-magnetic potting compound is molded peripherally around hub 66 to embed and rigidly fix sections 181–184 on hub 66 as best shown in FIGURES 5 and 7. In this position, the juncture of keeper section 184 with plate section 181 closely aligns with the longitudinal axis of well 162.

After the potting compound sets to provide a rigid mass, bore 176 is drilled into mass 188 in alignment with the axis of well 162 and passing through the region of juncture of plate section 181 with keeper section 184. The diameter of bore 176 is closely equal to that of well 162 and is large enough to separate keeper section 184 from plate section and to divide plate section 181 in half to provide separate portions 181a and 181b (see FIGURE 8) which are respectively integral with keeper sections 182 and 183. As a result, three equiangularly spaced apart pole faces 192, 193, and 194 are formed in a cylindrical envelope extending in coaxial, coextensive relation with the lower end of well 162. Pole faces 192–194 delimit bore 176 and thus are radially adjacent to the external periphery of well 162.

As best shown in FIGURE 6, magnet 138 is fixed on the lower end of shaft 160 in coaxial relation with well 162 and in radial alignment with pole faces 192–194. The most effective orientation of magnet 138 relative to pole faces 192–194 for providing the maximum magnetic coupling force between keeper unit 139 and magnet 138 is thus assured.

In the assembly of the register assembly parts with core 32, cover plate 48 and rotor assembly 28, the lower end of well 162 is required to be received in bore 176 in order for the sealed register to properly seat on cover plate 48. The provision of bore 176 thus assures that cover plate 48, core 32, shroud 42, well 162, and register 130 are all properly oriented with respect to each other.

As best shown in FIGURE 6, the inner walls of recesses 186 are flat and interfit with flat, parallel pole faces 196, 197, and 198 (see FIGURE 8) on the forward ends of flux keeper sections 182, 183, and 184 respectively. The thickness of support plate 64 between pole faces 196–198 and face 141 is relatively thin and uniform to assure a strong magnetic interaction between magnet 134 and flux keeper unit 139. As shown, pole faces 196–198 axially align with and are closely adjacent to magnet 134. Flux keeper sections 182–184 are parallel to the rotational axis of rotor 90.

Magnet 134 advantageously is so polarized as to provide two poles (one North and one South) spaced 180 degrees apart and extending the axial length of the magnet. Magnet 138 is polarized in the same manner. When the flux density from the north pole of magnet 134 is at a maximum with any one of the pole faces 196–198 of flux keeper sections 182–184, the south pole of magnet 134 will be midway between the other two flux keeper poles. Rotation of rotor 90 through 60 degrees from this position, however, brings the south pole of magnet 134 axially opposite one of the flux keeper pole faces 196–198 to provide maximum flux density between that flux keeper pole face and the south pole of magnet 134. Thus, by employing two poles on magnet 134 and three flux keeper sections 182–184, maximum flux magnetically coupling flux keeper unit 139 to magnet 134 is obtained at every 60 degree interval during rotation of rotor 90.

Magnet 134 interacts with pole faces 196–198 to produce a magnetic field at pole faces 192–194. The direction of this field corresponds to the angular position of the poles on magnet 134. Magnet 138 is thus rotated in a direction to align with the direction of the magnetic field at poles 192–194.

Resistive torque loading magnet 138 produces some phase differential in the relative angular positions of magnets 134 and 138. The angular phase difference between magnets 134 and 138 corresponds to a predetermined flux density in the air gaps, and a change in the phase difference results in a corresponding change in the magnetomotive forces. During the change of phase difference, therefore, mechanical work is done at the expense of stored energy in the magnetic circuit which is composed of magnets 134 and 138 and flux keeper sections 182–184.

By arranging the three flux keeper pieces of unit 139 and by mounting the annular drive and driven magnets 134 and 138 respectively on hub 94 and shaft 160 in the manner previously described, the axial spacing between rotor 90 and shaft 160 may be made very small to thus provide for an exceptionally axially compact, removable rotor and core structure as best illustrated in FIGURE 3. As a result, the removable insert assembly of rotor 90 and the other parts carried by core 32 may be constructed so that it is conveniently replaceable with an assembly providing for remote registration. Such remote registration assemblies are usually axially compact since they employ electrical or magnetic pick-up units in place of motion transmitting magnetic drive couplings. A typical remote registration assembly which may be used in place of the removable insert assembly comprising rotor 90 and the other parts mounted on core 32 is described in copending application Ser. No. 400,727, now U.S. Patent No. 3,342,070, filed on Oct. 1, 1964 for Fluid Meter and assigned to the assignee of this application. The meter construction of this invention therefore provides the significant advantage of interchangeably employing local registration drive insert assemblies (as shown in FIGURE 1) and remote registration assemblies (as illustrated in the aforesaid copending application) with the same meter housing and without requiring the disconnection of the meter housing from the pipeline.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fluid flow meter comprising a housing having fluid inlet and outlet openings, a fluid impelled rotor rotatably supported in said housing to be driven by fluid flow therethrough, register means, a shaft for driving said register means and being mounted for rotation about an axis that extends transversely of the rotational axis of said rotor, a permanent drive magnet mounted for rotation with said rotor about the rotational axis thereof, a permanent driven magnet fixed on said shaft, non-permanently magnetizable means defining a magnetic flux path between said drive and driven magnets for imparting rotation of said driving magnet to said driven magnet and said shaft, and means mounted in said housing for fixing said non-permanently magnetizable means against displacement, and said drive and driven magnets each being rotatable relative to said non-permanently magnetizable means.

2. The fluid flow meter defined in claim 1 wherein said non-permanently magnetizable means comprises at least one core piece extending between said drive and driven magnets and having pole faces spaced from and magnetically coupled to said drive magnet and said driven magnet respectively.

3. The fluid flow meter defined in claim 2 wherein the rotational axis of said shaft substantially transversely intersects the rotational axis of said rotor, and wherein a part of said core piece is parallel with and radially offset from the rotational axis of said rotor.

4. The fluid flow meter defined in claim 3 wherein said drive and driven magnets are annular and are mounted coaxially of the rotational axes of said rotor and said shaft respectively.

5. A fluid flow meter comprising a housing having fluid inlet and outlet openings, a fluid impelled rotor rotatably supported in said housing to be driven by fluid flow therethrough, register means, a shaft for driving said register means and being mounted for rotation about an axis that extends transversely of the rotational axis of said rotor, a hub forming a pair of said rotor, a permanent drive magnet mounted for rotation with said rotor about the rotational axis thereof and being seated in an end face of said hub, a permanent driven magnet fixed on said shaft, non-permanently magnetizable means defining a magnetic flux path between said drive and driven magnets for imparting rotation of the driving magnet to said driven magnet and said shaft, said non-permanently magnetizable means comprising at least one iron core piece extending between said drive and driven magnets and having pole faces spaced from and magnetically coupled to said drive magnet and said driven magnet respectively, shaft means received in said hub for supporting said rotor, fluid guide core means fixed in said housing and mounting said shaft means, and means fixedly supporting said iron core piece in said core means.

6. The fluid flow meter defined in claim 5 comprising means forming a chamber in said core means, said iron core piece being mounted within said chamber.

7. The fluid flow meter defined in claim 6 comprising a fixed well formed of non-magnetic material and having an inner closed end extending into said chamber and means rotatably mounting said shaft within said well, said driven magnet being annular and mounted on said shaft at the inner end of said well.

8. The fluid flow meter defined in claim 7 comprising means providing a side aperture in said housing, a cover plate detachably secured to said housing and extending over said aperture, and means fixing said core means and the outer end of said well to said cover plate to enable said core means, said well, said shaft, said shaft means, and said rotor to be removed unitarily with said cover plate.

9. The fluid flow meter defined in claim 7 wherein said means forming said chamber comprises an end plate fixed to said core means and having a hub portion extending into said chamber, said iron core piece being seated on said hub portion.

10. The fluid flow meter defined in claim 9 wherein said iron core piece is fixed in a mass of potting material and wherein the inner end of said well extends into said mass.

11. The fluid flow meter defined in claim 10 wherein the pole face magnetically coupled to said driven magnet is disposed radially outwardly of said driven magnet and said well.

12. The fluid flow meter defined in claim 11 wherein said non-permanently magnetizable means comprises another iron core piece having poles at opposite ends magnetically coupled to said drive magnet and said driven magnet respectively, the inner end of said well being received in a bore formed in said mass and delimited by the pole faces of said core pieces that are magnetically coupled to said driven magnet.

13. The fluid flow meter defined in claim 11 wherein the axis of said shaft transversely intersects the rotational axis of said meter.

14. The fluid flow meter defined in claim 13 wherein said core means cooperates with said housing to define an annular channel through which fluid passing through said housing flows, said rotor having a plurality of blades supported on said hub and extending into the path of fluid flow through said channel.

15. A fluid flow meter comprising a housing having fluid inlet and outlet openings, a fluid impelled rotor rotatably supported in said housing to be driven by fluid flow therethrough, register means, a shaft for driving said register means and being mounted for rotation about an axis that extends transversely of the rotational axis of said rotator, a permanent drive magnet mounted for rotation with said rotor about the rotational axis thereof, a permanent driven magnet fixed on said shaft, non-permanently magnetizable means defining a magnetic flux path between said drive and driven magnets for imparting rotation of said driving magnet to said driven magnet and said shaft, said non-permanently magnetizable means comprising at least one iron core piece extending between said drive and driven magnets and having pole faces spaced from and magnetically coupled to said drive magnet and said driven magnet respectively, shaft means supporting said rotor in said housing, fluid guide core means fixed in said housing and mounting said shaft means, and means including a mass of potting material fixing said iron core piece in said core means.

16. The fluid flow meter defined in claim 15 comprising a well projecting into said housing and rotatably mounting said shaft with said driven magnet being mounted on said shaft at the inner end of said well, and a bore formed in said mass and receiving the inner end of said well, said bore being delimited by the pole face that is magnetically coupled to said driven magnet.

17. A magnetic coupling drive assembly for a meter or the like comprising a rotatably mounted, permanent, annular drive magnet, a permanent, annular, driven magnet mounted for rotation about an axis extending transversely of the axis about which said drive magnet rotates, non-permanently magnetizable flux keeper means providing a flux path between said drive and driven magnets and comprising a plurality of iron core pieces each having pole faces at opposite ends that are spaced from and magnetically coupled to said drive magnet and said driven magnet respectively, means including a mass of potting material in which said core pieces are embedded, a core formed in said mass and delimited by the pole faces that are coupled to said driven magnet, and means supporting said driven magnet in said bore for rotation about an axis that is coaxial with said bore.

18. The magnetic coupling defined in claim 17 wherein the ends of each core piece respectively face axially of the rotational axis of said drive magnet and radially of the rotational axis of said driven magnet.

19. The magnetic coupling defined in claim 18 wherein the pole faces coupled to said driven magnet are contained in a cylindrical envelope.

20. In a fluid flow meter, a housing having fluid inlet and outlet openings, a rotor support shaft member non-rotatably mounted in said housing with its longitudinal axis extending parallel to the direction of fluid flow therethrough, a bladed, fluid impelled rotor coaxially journalled on said shaft member to be driven by fluid flow through said housing, a fixed, rigid tubular well of non-magnetic material projecting into said housing along an axis extending transversely of the rotor rotational axis and in axially spaced relation to said rotor, drive magnet means carried by said rotor for rotation therewith, driven magnet means mounted for rotation within said well and adapted to be operatively connected to a register means, stationary non-permanently magnetizable means formed separately of said well and disposed between said rotor and said well and magnetically coupling said driven magnet means to said drive magnet means for transmitting rotation of said rotor to said driven magnet means, and means mounted in said housing for fixing said non-permanently magnetizable means against displacement, and said drive and driven magnets being rotatable relative to said non-permanently magnetizable means.

21. In a fluid flow meter, a housing having fluid inlet and outlet openings, a rotor support shaft member non-rotatably mounted in said housing with its longitudinal axis extending parallel to the direction of fluid flow therethrough, a bladed, fluid impelled rotor coaxially journalled on said shaft member to be driven by fluid flow through said housing, a fixed, rigid tubular well of non-magnetic material projecting into said housing along an axis extending transversely of the rotor rotational axis and in axially spaced relation to said rotor, drive magnet means carried by said rotor for rotation therewith, driven magnet means mounted for rotation within said well and adapted to be operably connected to a register means, and stationary means disposed between said rotor and said well and magnetically coupling said driven magnet means to said drive magnet means for transmitting rotation of said rotor to said driven magnet means, said drive and driven magnet means being permanent magnets, and said stationary means comprising a non-permanently magnetizable core piece extending axially with respect to the rotor rotational axis.

22. The fluid flow meter defined in claim 21 wherein said means mounting said shaft member comprises a fluid guide structure mounted in said housing to define a fluid flow channel of annular cross section extending longitudinally between said inlet and outlet openings in coaxial relation with the rotor rotational axis for directing fluid through and beyond the blades of said rotor, said fluid guide structure having a fixed core element into which the inner end of said well projects radially with respect to the rotor rotational axis, with said core piece being mounted in said core element.

23. The fluid flow meter defined in claim 22 wherein said shaft member is mounted in cantilever fashion on said core element and wherein said rotor is mounted on the free, unsupported end of said shaft member axially adjacent to said core element.

24. The fluid flow meter defined in claim 20 comprising a core element mounted in said housing and receiving said stationary means, means supporting said shaft member from core element in cantilever fashion, and bearing means on the free, unsupported end of said shaft member for mounting said rotor axially closely adjacent to said core element.

25. The fluid flow meter defined in claim 24 wherein said means supporting said shaft member comprises a part carried by said core element and mounting said stationary means.

26. The fluid flow meter defined in claim 25 wherein said core element has a hollow interior delimited by an end wall portion at its end axially remote from the end adjacent to said rotor, and wherein said part is formed with a sleeve portion supportingly receiving an end of said shaft member and extending into a bore in said end wall portion.

27. The fluid flow meter defined in claim 26 wherein the inner end of said well extends radially into said core element and wherein said drive magnet means are mounted at an end face of said rotor axially facing said core element.

28. In a magnetic coupling assembly having a pair of rotatably mounted members extending transversely with respect to each other and means for establishing a magnetic torque coupling effect to drive couple said members, said means comprising a first permanent magnet mounted for rotation with one of said members, a second permanent magnet mounted for rotation with the other of said members, and non-permanently magnetizable means defining at least one flux path for magnetically coupling said first and second magnets together and being configured to bend the lines of flux therein from a direction extending axially of the rotational axis of said one member to a direction extending radially of the rotational axis of said other member.

29. The magnetic coupling defined in claim 28 wherein said first magnet is axially polarized and wherein said second magnet is annular.

30. The magnetic coupling defined in claim 29 wherein the polarization axis of said first magnet is contained in a plane normally intersecting the rotational axis of said one member, wherein said second magnet is coaxial with said other member, and wherein the rotational axis of said other member intersects the rotational axis of said one member at a point that is axially spaced from said first magnet.

31. The fluid flow meter defined in claim 1 wherein said non-permanently magnetizable means comprises a plurality of core pieces each extending between said drive and driven magnets and each having pole faces spaced from and magnetically coupled to said drive magnet and said driven magnet respectively, at least one of said core pieces being configured to bend the lines of flux therein from a direction extending axially of the rotational axis of said rotor to a direction extending transversely of the rotational axis of said shaft.

References Cited

UNITED STATES PATENTS

| | | | |
|---|---|---|---|
| 280,322 | 6/1883 | Nash | 310—104 |
| 2,470,249 | 5/1949 | Karasick. | |
| 2,564,676 | 8/1951 | Crouse | 310—104 X |
| 2,566,220 | 8/1951 | Lindley et al. | 310—104 X |
| 2,713,261 | 7/1955 | Butterworth et al. | 73—231 X |
| 2,728,893 | 12/1955 | Bartelink | 73—231 X |
| 3,049,009 | 8/1962 | McCall et al. | 73—231 X |
| 3,169,398 | 2/1965 | Sparling et al. | 73—231 |

FOREIGN PATENTS

| | | |
|---|---|---|
| 1,078,388 | 5/1954 | France. |

RICHARD C. QUEISSER, *Primary Examiner.*

E. D. GILHOOLY, *Assistant Examiner.*

UNITED STATES PATENT OFFICE
CERTIFICATE OF CORRECTION

Patent No. 3,398,577                                                August 27, 1968

Zoltan Kovats et al.

It is certified that error appears in the above identified patent and that said Letters Patent are hereby corrected as shown below:

Column 2, line 26, "driven" should read -- drive --. Column 4, line 28, "regiser" should read -- register --. Column 5, line 44, after "section", first occurrence, insert -- 181 --. Column 7, line 37, "pair" should read -- part --. Column 8, line 31, "rotar" should read -- rotor --.

Signed and sealed this 17th day of February 1970.

(SEAL)
Attest:

Edward M. Fletcher, Jr.                                    WILLIAM E. SCHUYLER, JR.
Attesting Officer                                                       Commissioner of Patents